United States Patent [19]

Ching

[11] Patent Number: 5,917,872
[45] Date of Patent: Jun. 29, 1999

[54] SINGLE CHIP DEVICE FOR DECODING ANALOG SIGNALS CARRYING DIGITAL DATA

[75] Inventor: Philip B.F. Ching, Kanata, Canada

[73] Assignee: Mitel Corporation, Kanata, Canada

[21] Appl. No.: 08/583,064

[22] PCT Filed: Jul. 4, 1994

[86] PCT No.: PCT/CA94/00363

§ 371 Date: Jan. 5, 1996

§ 102(e) Date: Jan. 5, 1996

[87] PCT Pub. No.: WO95/02296

PCT Pub. Date: Jan. 19, 1995

[30] Foreign Application Priority Data

Sep. 5, 1993 [CA] Canada ................................ 2099838

[51] Int. Cl.[6] ............................................. H04L 25/38
[52] U.S. Cl. ...................... 375/369; 341/100; 395/891
[58] Field of Search ................... 375/369, 360; 341/100; 370/366, 305; 396/891; 364/239.2

[56] References Cited

U.S. PATENT DOCUMENTS

| | | | |
|---|---|---|---|
| 3,946,379 | 3/1976 | Lippman | 341/100 |
| 4,447,804 | 5/1984 | Allen | 341/100 |
| 4,764,896 | 8/1988 | Freimark et al. | 395/823 |
| 4,768,163 | 8/1988 | Clark et al. | 395/891 |
| 5,313,496 | 5/1994 | De Goede | 375/342 |
| 5,394,109 | 2/1995 | Simard | 375/334 |

*Primary Examiner*—Stephen Chin
*Assistant Examiner*—Betsy L. Deppe
*Attorney, Agent, or Firm*—Marks & Clerk

[57] ABSTRACT

A method is disclosed for extracting data words from a binary serial bit stream having a fixed bit rate and consisting of fixed length words of n bits each, where n is an integer, each word is preceded by a start bit and followed by one or more stop bits. First a predetermined identifiable transition is detected in said bit stream preceding each data word. A clock signal (DCLK) consisting of n clock pulses is generated in response to each detection of the predetermined transition in coincidence with the bits the data word following the predetermined transition. A data ready signal (DR) is generated after the passage of n bits to delineate the word boundary, and the data words are extracted from the bit stream using the thus generated clock pulses and the data ready signal.

6 Claims, 5 Drawing Sheets

SINGLE CHIP DEVICE FOR DECODING ANALOG SIGNALS CARRYING DIGITAL DATA

This invention relates to a single chip device for decoding an analog signal carrying digital data representing call identity information.

Telephone companies are increasingly offering call information services. One such service employs signaling, in which the call identity information is transmitted as a CPBFSK (continuous phase binary frequency shift keying) signal between the ringing tones of a calling signal. The CPBFSK signal can typically contain information for services such as calling number delivery (CND), calling identity delivery on call waiting (CIDCW), and calling name delivery (CNAM).

The information contained in the CPBFSK signal is currently extracted by circuitry incorporated in the user equipment or an add-on unit and presented to the user on an LCD display. The CPBFSK signal can contain a wealth of information, and in the future it is likely that increasing amounts of information will become available. It is important to be able to extract this information as useful data words, either simply for display on the local display device or for interfacing with a computer. For example, a telemarketing firm might wish to extract the number of the call party and match it with information in its local database so as to bring up information about the customer prior to accepting an incoming call.

In the prior art, the CPBFSK signal is first demodulated by a CPBFSK demodulator (e.g. Motorola MC145447). The demodulator output is a serial binary data bit stream. The 8-bit data words in the bit stream must be extracted before the information can be further processed by a microprocessor for example.

Data word extraction is typically performed by a universal asynchronous receiver transmitter (UART). The UART may be a discrete unit (e.g. National Semiconductor NS16450), or embedded in a microprocessor (e.g. Intel 8051). The bit stream goes into the serial input of the UART which extracts the 8-bit words and presents them at an 8-bit wide parallel output.

The prior art thus requires a discrete UART, which is generally a relatively complex device having a relatively high power consumption.

An object of the invention is to provide a simplified device capable of decoding CPBFSK signaling that has a low power consumption.

Accordingly, the invention provides a single chip device for decoding an analog signal carrying digital data having a fixed bit rate and consisting of fixed length words of n bits each, where n is an integer, each word being preceded by a start bit and followed by one or more stop bits, comprising an analog demodulator including a switched-capacitor low pass filter for producing from said analog signal at the output of said low pass filter a baseband signal; means for hard limiting said baseband signal to produce a raw bit steam (RDATA); digital means running in synchronism with said analog demodulator for deriving from said raw bit stream a data stream (DATA) containing data bits defining data words and stop and start bits bounding each data word; means for detecting a predetermined identifiable transition in said bit stream preceding each data word; means for generating a clock signal (DCLK) consisting of n clock pulses in response to each detection of said predetermined transition in coincidence with the bits of the data word following said predetermined transition; and means for generating a data ready signal (DR) after the passage of n bits to delineate the word boundary, whereby said data words can be extracted from said bit stream with the aid of said thus generated clock pulses (DCLK) and said data ready signal (DR).

An important aspect of the invention is the extraction of fixed bit length data words from a binary serial bit stream without a discrete UART device, nor the high hardware overhead associated with a full feature UART device included into an integrated circuit performing other functions, nor the need for the UART function to be implemented in microprocessor software.

The circuit in effect provides a three-wire interface that can be implemented on a single chip complete with a CPBFSK demodulator. The three-wire interface provides a data signal, which is a serial bit stream, a DCLK (data clock) signal which identifies the ideal sample instance of the data bits and the data words of the serial bit stream, and a DR (data ready signal) which signifies the end of a data word. The circuit is suitable, for example, for the word format specified by R-35, R-42 (transmission rate), R-44, and R-46 of Bellcore document TR-TSY-00003, "Voiceband Data Transmission Interface Generic Requirements".

Any suitable fixed bit rate can be implemented, but commonly a bit rate of 1200 bps and 8-bit word length are employed.

The circuit, known as a CNIC (calling number identification circuit), when implemented as a single chip receives the incoming analog CPBFSK signal from the telephone line. The CNIC produces the data stream, which is output as the data signal and the DCLK and DR signals are output as part of the three-wire interface. These can be fed to a shift register to generate parallel data words, or alternatively the data and data clock signals are fed to an input port of a microprocessor with the data ready signal being supplied through an interrupt request line.

The invention will now be described in more detail, but way of example only, with reference to the accompanying drawings, in which.

Figure 1:
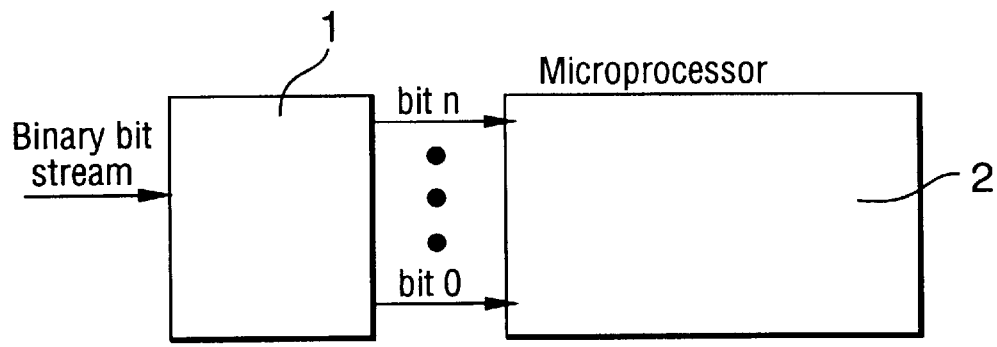
FIG. 1 shows a prior art data extraction circuit.

FIG. 1 shows a prior art data extraction circuit. The binary bit stream from a separate CPBFSK demodulator (not shown) is inputted to a UART (universal asynchronous receiver transmitter) 1 that outputs a parallel stream of binary words for application to the bus of microprocessor 2. The UART, which may be for example a national semiconductor NS16450 chip, is a relatively complex device that is programmed according to the characteristics of the data stream. Alternatively the UART can be embedded in the microprocessor itself.

Figure 2:
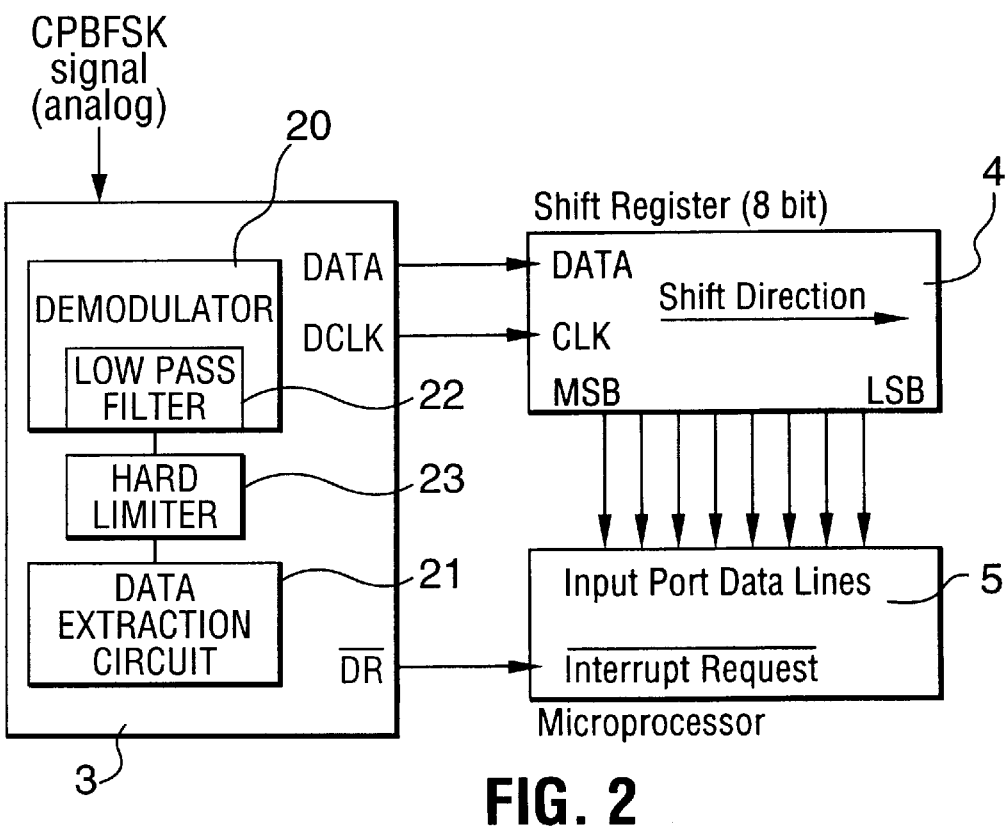
FIG. 2 shows a circuit in accordance with the invention.

FIG. 2 shows a circuit in accordance with the invention. An analog CPBFSK signal direct from a telephone line is input to CNIC chip 3, which incorporates a CPBFSK demodulator. The CNIC chip 3, which will be described in more detail with reference to FIG. 7, comprises analog demodulator 20 and a data extraction circuit 21. The demodulator 20 includes a capacitor-switched low pass filter 22, which produces a baseband signal that is passed to a hard limiter 23 to produce a raw bit stream RDATA. The circuit 21 outputs a serial bit stream as a data signal for application to the data input of shift register 4. CNIC chip 3 generates a data clock signal DCLK for application to the clock input of shift register 4. On each clock pulse, the data is shifted one position along the 8-bit shift register 4.

The CNIC chip 3 also generates a data ready signal (DR) for input to an interrupt request line of a microprocessor 5 which receives at a parallel input port parallel data from the shift register 4. Upon receipt of each DR signal, contents of the shift register are transferred in parallel to the microprocessor 5.

Figure 3:
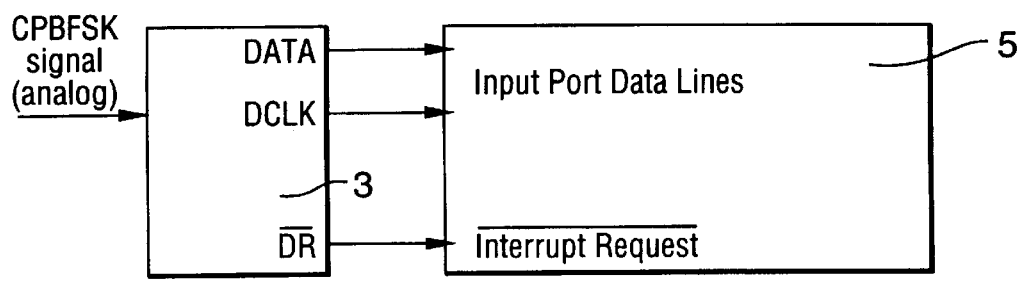
FIG. 3 shows a alternative embodiment of the invention.

FIG. 3 shows an alternative embodiment where the three-wire output of the CNIC chip 3 is applied directly to a microprocessor 5. The DCLK and DATA signals are connected to 2 bits of the microprocessor input port. The microprocessor software saves the DATA bit whenever it detects a logical 0 to 1 transition at the DCLK bit. An 8-bit word is then assembled from the last 8 saved bits when DR goes low. DR may be applied as an interrupt request of the microprocessor or a third bit of the input port.

The operation of the above circuits will now be described with reference to FIG. 4.

Figure 4:
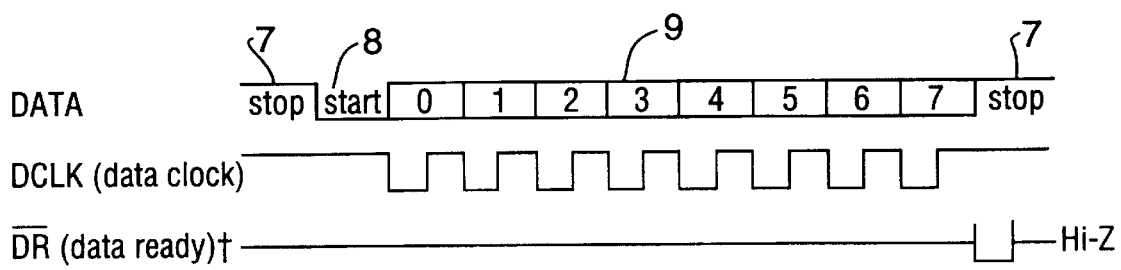
FIG. 4 shows the output signals from the data extraction circuit.

FIG. 4 shows the demodulated DATA signal 9 coming from the CNIC chip 3. This signal comprises two stop bits 7 and a start bit 8. Each byte (8-bit word) is preceded by a start bit and followed by at least one stop bit.

The stop to start transition (DATA changes from 1 to 0) is used as an event trigger. A set of eight 50% duty cycle DCLK pulses are generated by the trigger, one for each data bit. No pulse is generated for the start and stop bits. Each clock cycle is nominally 1200 Hz to coincide with the data rate. The low to high transition of DCLK is used to read DATA at the nominal half way point of each data bit. DCLK is used to clock the 8 bit serial-in-parallel-out shift register receiving the DATA signal. A low pulse is generated at the open drain DR output after the last data bit to delineate the word boundary. This is used to cause the data in the serial-in-parallel-out shift register to be read out or as a microprocessor interrupt to group the preceding 8 data bits into a word.

In order for the 3-wire interface to operate properly, the serial bit stream (DATA) should be at logical 1 when no words are being received. When the reception begins, the first logical 0 in the serial bit stream is taken to be a stop bit to start bit transition, hence the beginning of an 8-bit word. The first logical 0 in the serial bit stream must occur only at a received bit boundary.

To convert the 8-bit words into parallel format, DATA is connected to the data input of an 8-bit shift register shifted by a high going clock (e.g. 74HC164), and DCLK to the shift register's clock input. The microprocessor inputs the 8-bit word every time DR is low.

Figure 5:
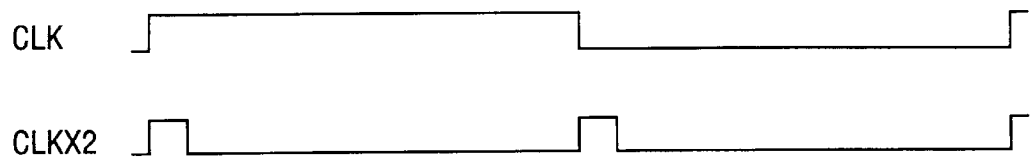
FIG. 5 is a timing diagram.
Figure 6:
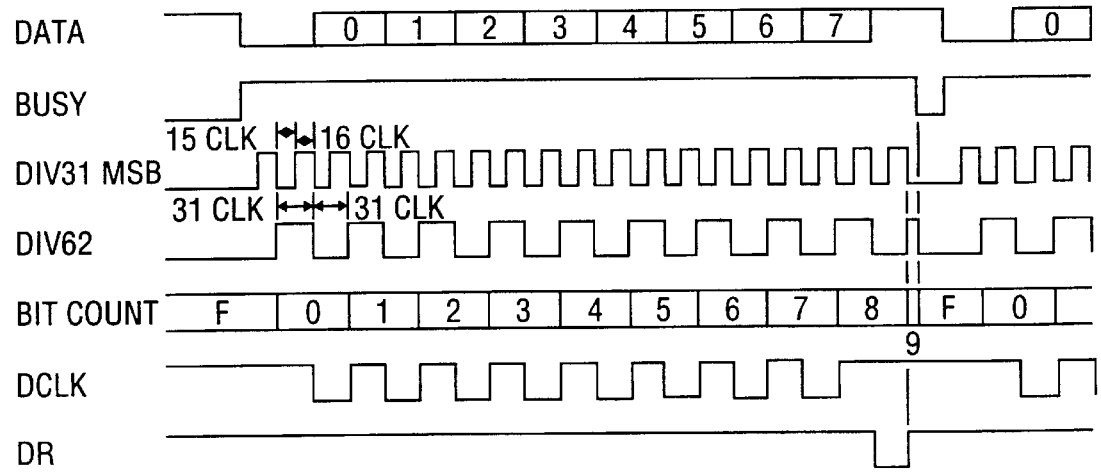
FIG. 6 is a more complete timing diagram.

Referring now to FIGS. 5 and 6 and the circuit shown in FIG. 7, the method of generation of the clock and data ready signals will be described.

Because the protocol (TR-NWT-000030) specifies an 8-bit data word bounded by a start bit (logical 0) and a stop bit (logical 1), the data bit and word timings can be extracted for the entire message at a specific baud rate once the beginning of the first word has been determined. The regenerated bit rate does not have to match that of the transmitter exactly because the bit timing is re-aligned at the beginning of every word. The timing extractor works by synchronizing to the stop to start bit transition at the beginning of the word. It is then a simple task to generate bit and word timings for a fixed baud rate. The circuit in FIG. 7 works for one start bit only. Any number of stop bits is acceptable because only the stop to start bit transition is required. This arrangement also ensures that the digital portion of the chip (FIG. 7) runs in synchronism with the analog portion.

In TA-NWT-000030, it is proposed that the data may be preceded by either one of two preambles: a 300 bits repeating 1010 channel seizure signal followed by an 80±10 bit mark interval for on-hook data transmission, or just the mark interval for off-hook data transmission.

If the 1010 and mark preamble is sent, the recovered data words are (the bits are in the order they are received, start and stop bits have been stripped):

10101010

. . .

10101010
and one of
10101010
10101011
10101111
10111111
11111111 followed by the data words. The marks are invisible because no bit and word timing is generated. They are just stop bits. There are 5 possibilities for the last data word in the channel seizure signal because the carrier detector may have become active in the middle of a word at the beginning of the preamble. The number of 10101010 words is less than 30 because the first words are not recognized: DATA is forced to 1 while the fsk signal is being integrated by the carrier detector.

In the mark only case, there is no problem because the first 1 to 0 transition in the data stream is the start bit of the first data word. However, it is important that there is no 1 to 0 transition in the recovered data during the mark interval. Otherwise, extraneous data words would be received. This is ensured by the carrier detector and recovered data interlock.

Figure 7:
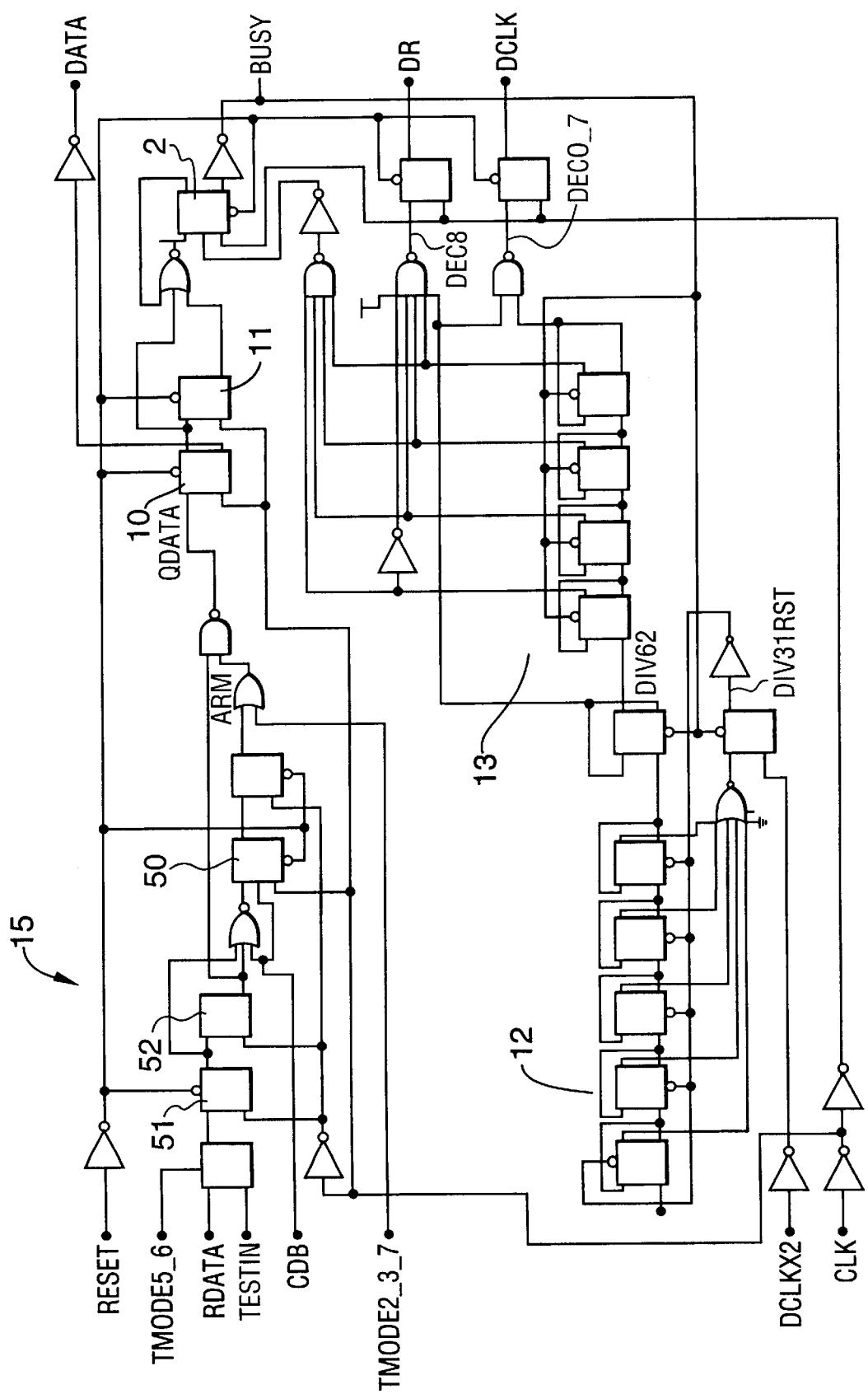
FIG. 7 is a block diagram of the data extraction circuit for generating signals employed in the invention.

The DATA and CDB interlock is shown as 15 in FIG. 7. RDATA is the hardlimited lowpass filter output. It is sampled at DCLK's rising edge. RDATA 1 to 0 transition is detected with 2 DFF's. If CDB is low when the transition occurs, the JK flip flop 50 will be set. ARM goes high at the next DCLK rising edge. If ARM is high, the output of the second flip flop 52 becomes QDATA, the interlock output. When CDB is deactivated, ARM is cleared asynchronous to the bit cell boundary because all valid data had already been received.

As shown in FIG. 5, a clock signal DCLK is generated by dividing a local oscillator frequency by 48. This is then divided by 62 to arrive at the clock rate DCLK for the circuit 4. The rising edge of DCLK normally occurs at the middle of a bit cell, which is the ideal sample instant. DR is low during the first half of the stop bit, and this denotes the end of the word.

QDATA is the raw binary serial bit stream. QDATA change is synchronous with the rising edge of CLK. It is delayed by half a CLK cycle to become DATA.

The qualified data QDATA is monitored by two D type flip flops 10,11 (FIG. 7). While timing extraction is not in progress, the (J–K type flip flop) output BUSY is low to keep the timing extractor under reset. On the QDATA 1 to 0 transition, BUSY is set. It remains set until after the bit and word timings for 1 word have been generated. The next QDATA 1 to 0 transition thereafter restarts the extractor. The main elements of the timing extractor are a bit time counter 12 and a bit counter 13.

The bit time counter 12 divides CLK by 62 to generate one bit time. It is advanced by CLK's falling edge. First, a half bit time counter divides CLK by 31. Then the MSB's falling edge clocks a toggle flip-flop so that the output DIV62 has a 50% duty cycle. The half bit time count is from 1 to 31. The count is evaluated by the falling edge of CLKX2 whose rate is twice that of CLK (see FIG. 5). When the count cycles from 31 to 0, a half CLK long pulse DIV31RSTB is generated to preset the count to 1.

The bit time counter output DIV62's rising edge increments the bit counter 13. The bit count and DIV62 are evaluated to obtain the bit and word timings DCLK, DR shown in FIG. 6. When BUSY is inactive low, the count is preset to F. The count sequence is F-0-. . . . -7-8-9-F. DCLK is low when the count is from 0 to 7 and DIV62 is low. DR is low when the count is 8 and DIV62 is low. When the count is 9, BUSY goes low and puts the timing extractor back into idle.

Figure 8:
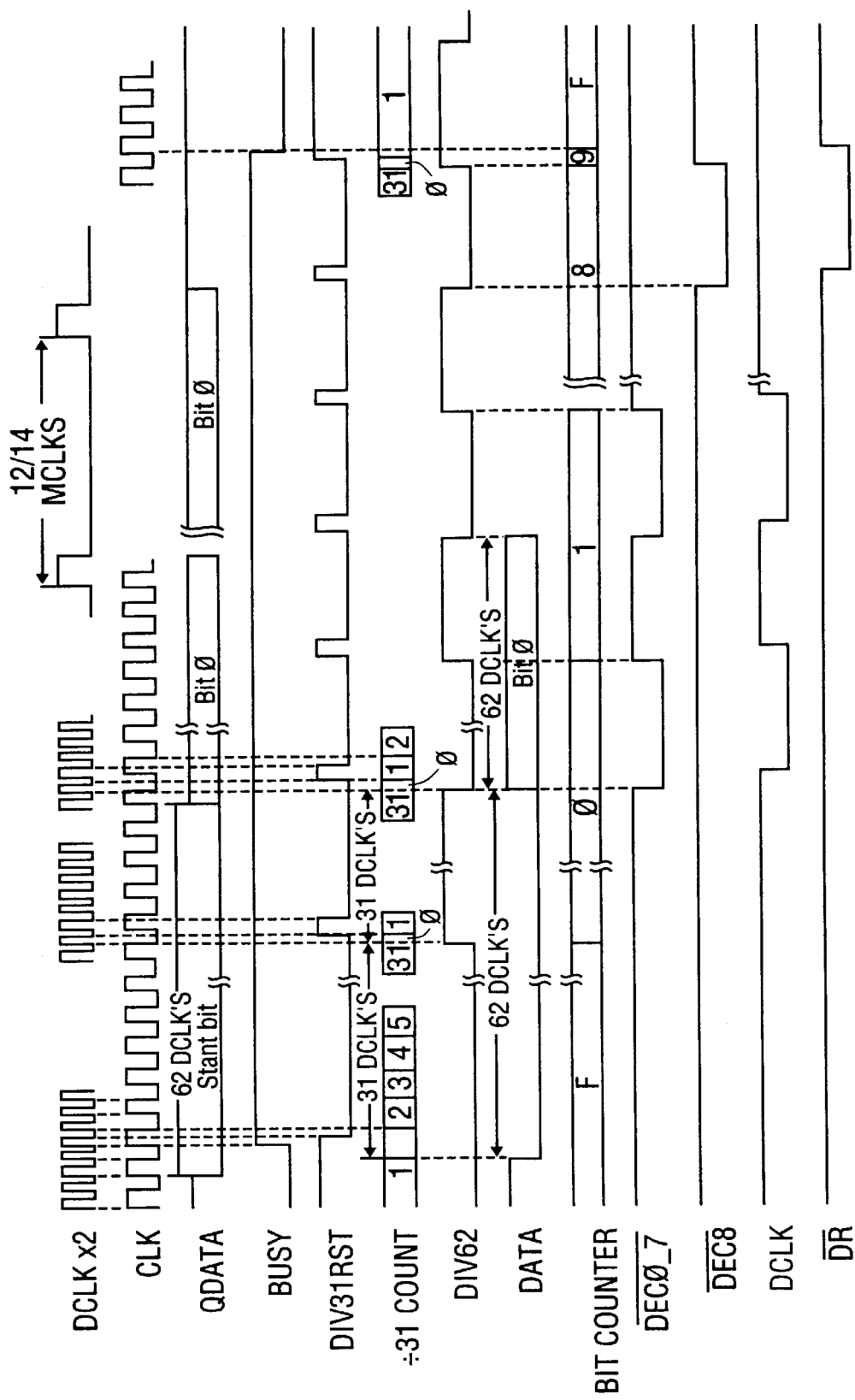
FIG. 8 is an alternative timing diagram to that shown in 6.

FIG. 8 shows a more detailed timing diagram, in which DIV31st is the output of a D type flip-flop clocked by DCLKX2.

Ideally DR should return to inactive half way into the stop bit after each word. Discrepancy is caused by mismatch between the regenerated and the transmitted baud rates. If the local oscillator frequency is 3.579545 MHz, then CLK is 74574 Hz. The time required for 9.5 bauds is (9.5/1200)(/1/74574)=590.38 CLK cycles. The actual time for 9.5 regenerated bauds is 9.5×62=589 CLK periods. Thus the regenerated timing finishes slightly early.

In a circuit in accordance with the invention, the incoming analog signal is first passed to a CPBFSK demodulator, which implements a conventional scheme (see for example Carlos A. Laber and Pierre P. Lemaitre, "A monolithic 1200 baud FSK CMOS modem", IEEE Journal of Solid-State Circuits, vol. SC-19, pp. 861–869, December 1984).

The demodulator consists of an anti-aliasing filter, band pass filter, sign bit delay, and multiplier and low pass filter. The demodulator output is the low pass filter output RDATA shown as an input to FIG. 7.

The described arrangement thus provides a convenient way of extracting information embedded in a CPBFSK or similar signal. It can be used as a source of data for call display devices or as an input to more sophisticated computer-based systems, which for example look up in a database data relating to a calling party and display it before the called party even answers the telephone.

I claim:

1. A single chip device for decoding an analog signal carrying digital data having a fixed bit rate and consisting of fixed length words of n bits each, where n is an integer, each word being preceded by a start bit and followed by one or more stop bits, comprising:

an analog demodulator including a switched-capacitor low pass filter for producing from said analog signal at the output of said low pass filter a baseband signal;

means for hard limiting said baseband signal to produce a raw bit stream (RDATA);

digital means running in synchronism with said analog demodulator for deriving from said raw bit stream a data stream (DATA) containing data bits defining data words and stop and start bits bounding each data word;

means for detecting a predetermined identifiable transition in said data stream preceding each data word;

means for generating a clock signal (DCLK) consisting of n clock pulses in response to each detection of said predetermined transition in coincidence with the bits of the data word following said predetermined transition; and means for generating a data ready signal (DR) after the passage of n bits to delineate the word boundary, whereby said data words can be extracted from said data stream with the aid of said thus generated clock pulses (DCLK) and said data ready signal (DR).

2. A single chip device as claimed in claim 1, which is connected to a shift register that is shifted by said generated clock signal and that outputs parallel data words.

3. A single chip device as claimed in claim 1, which is connected to a microprocessor, said clock signal and said data signal being fed to an input port thereof, said microprocessor being programmed to save a data bit whenever it detects a logical transition of the clock signal (DCLK) and assemble an n bit data word from the last n bits prior to receipt of the data ready signal.

4. A single chip device as claimed in claim 2, which is further connected to a microprocessor and wherein said data ready signal is supplied as an interrupt request to said microprocessor to cause said microprocessor to input a data word from said shift register.

5. A single chip device as claimed in claim 1, wherein said demodulator is a CPBFSK demodulator.

6. A single chip device as claimed in claim 5, wherein said single chip device is a caller id chip capable of decoding caller id information from a telephone line.

* * * * *